Jan. 20, 1953          C. REED          2,626,132

MIXING DEVICE FOR FROZEN CONFECTIONS

Filed Sept. 15, 1948          2 SHEETS—SHEET 1

Inventor
Claude Reed
By Arthur H. Sturges
Attorney

Jan. 20, 1953 C. REED 2,626,132
MIXING DEVICE FOR FROZEN CONFECTIONS
Filed Sept. 15, 1948 2 SHEETS—SHEET 2

Inventor
Claude Reed
By Arthur H. Sturges
Attorney

Patented Jan. 20, 1953

2,626,132

UNITED STATES PATENT OFFICE 2,626,132

MIXING DEVICE FOR FROZEN CONFECTIONS

Claude Reed, Omaha, Nebr.

Application September 15, 1948, Serial No. 49,339

19 Claims. (Cl. 259—44)

This invention relates to stirring devices and particularly to those employed for preparing frozen confections.

In the stirring of frozen confections including malted milks and the like the time element is very important. Establishments serving ice cream operate efficiently and economically in direct proportion to the speed at which waitresses can prepare orders.

Accordingly, it has been my desire to perfect a mixing device which eliminates the time consuming steps of placing a plurality of ingredients in a container, leaving the container on a mixing machine for a period of time before removal, scooping out the contents, and then cleaning the container sufficiently for reuse in the later preparation of a confection possibly having a different flavor.

Experiments were conducted with containers having open ends. These were employed for the reception of a mass of frozen confection which is prepared in advance at a creamery and delivered to an ice cream dealer in frozen form. Such a mass is in a shape complemental to the open-ended container for fitting into the container ready for stirring to a desired serving consistency.

Experiments were made in the use of an auger as a beater. Various types of augers and containers were tested and it was found that in order to work with maximum efficiency the auger should have blades at its lower end of small size. Preferably, the auger should taper to a point. The auger tested was caused to rotate in a direction for forcing the confection downwardly through a container at a time when the container was being pushed upwardly against the lower end of the auger.

There are two conditions that must be met for optimum results. One of these is that the auger convolutions engage the side walls of the container so that, at the end of stirring, the product will not only have been forced outwardly of the lower end of the container but the product will be wiped automatically and sufficiently from the side walls of the container.

Augers having convolutions of equal radius throughout were tried in conjunction with containers of cylindrical shape snugly fitting over the augers. It was found that the lowermost convolution of the auger was of such area that an excessive amount of pressure was required to force the container full of confection onto the auger, since the auger is purposely rotated in a direction for forcing confections away from itself, not for boring.

Augers having most of their convolutions in equal radius and having their lower most convolutions of lesser radius were tried. It was found that the lowermost convolutions being of smaller area, tended to receive the confection without the necessary application of as great an amount of force.

It was also found, however, that since a cylindrical container was used having a flat partially open bottom, that the lowermost convolutions did not wipe the bottom clean. As a result, with a flat bottomed container using an auger having a lowermost convolution of a lesser radius than the bottom of the container, the container was not automatically cleaned and scooping was necessary.

Further experiments showed that a conical container used with an auger of complementally shaped convolutions is best. With this equipment the auger automatically cleaned the container since the convolutions thereof were constructed for touching the wall of the container at all points during rotation. Also, with an auger of this shape the lowermost convolutions are of an area small enough to permit the confection to be received thereon more easily.

Containers having walls which are sufficiently tapered towards their lower ends and straight or cylindrical at their upper ends, will also work efficiently. A conical shape is not absolutely necessary since even if the interior container walls are tapered towards each other in an arc, and the auger used is complementally shaped, results will be substantially similar.

It is therefore an object of this invention to provide a mixer for frozen confections which is adapted to mix a mass of confection with a maximum of efficiency and time conservation.

A further object of the invention is to provide a mixer as described which is adapted to deliver frozen confection at an optimum viscosity and palatability.

Still another object of the invention is to provide means for delivering frozen confection at a uniform state of mixing.

Still another object of the invention is to provide an auger-mixer as described, certain spaced-apart portions of the convolutions of which are absent for providing cutting surfaces to facilitate the mixing of the confection.

It is well known that temperature is very critical in the preparation of frozen confection. A very small temperature variation can cause melting to an undesirable extent or freezing to a too solid state. It is difficult to deliver a frozen confection to the customer consistently and at uniform temperature.

It is a further object of the invention to provide means for treating a factory or creamery prepared mass of frozen confection to quickly change its consistency or viscosity to that desired by customers.

Yet a further object of the invention is to provide an auger construction for use with the present invention which employs a plurality of convolutions, each of which can be manufactured from flat sheet metal and assembled on a shaft for maximum economy in manufacture.

Another object of the invention is to provide a device for the purpose described which is sturdy and durable in construction, reliable and efficient in operation, and relatively simple and inexpensive to manufacture, assemble and utilize.

Other and still further objects and advantages of the invention will become apparent from the following detailed description of a preferred embodiment thereof.

Figure 1:
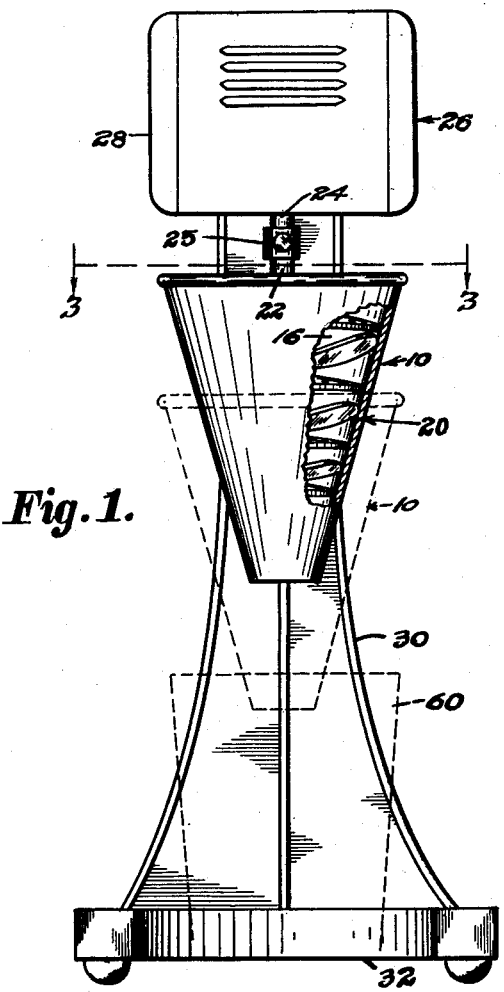
Figure 1 is a frontal elevation of a mixing machine showing the auger and container of the present invention secured thereto, a portion of the container being broken away; a position of the container at the start of mixing being shown in dotted lines; a glass disposed beneath the container for receiving the confection being shown in dotted lines; and the frozen confection not being shown.
Figure 2:
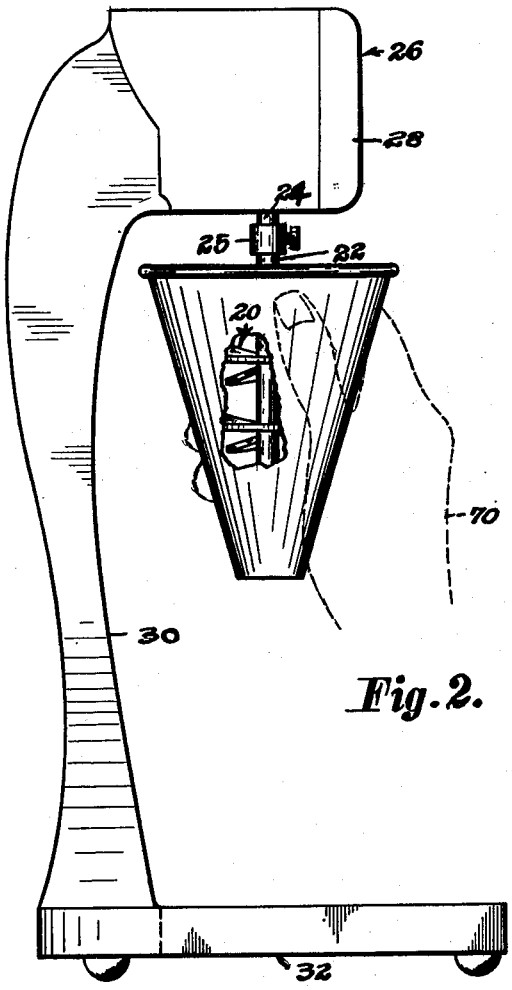
Figure 2 is a side elevation of the mixer auger and container, a side wall portion of the container being broken, and an operator's hand being shown holding the container for forcing the latter upwardly onto the auger, frozen confection not being shown.

The mixing machine of this invention includes a container generally indicated at 10 in Figure 1. The container 10 is provided with openings 12 and 14 at its top and bottom respectively.

The container 10 is preferably of frusto-conical shape as seen from the outside in side elevation and is provided with a frusto-conically shaped hollow interior 16 which is disposed in communication with end openings 12 and 14.

If desired, the container may be of other shapes. The container shown in Figure 1 is provided with side walls which taper toward each other from a wider normally upper end to a narrower normally lower end. If this condition is met, the side walls of the container could be made arcuate rather than straight.

Also, if a lower portion of the container is as described, an upper portion of the container may be of another shape, as for instance, cylindrical.

The side walls of the container are inclined toward each other so that frozen confection will be compressed thereagainst as it passes downwardly through the container during stirring as later described.

Figure 4:
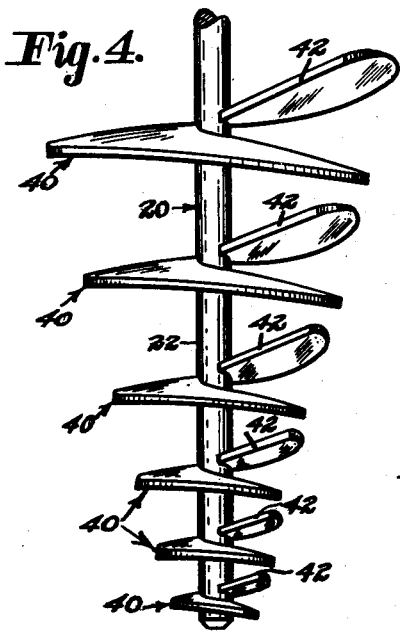
Figure 4 is a side elevation of a lower portion of the auger.
Figure 5:
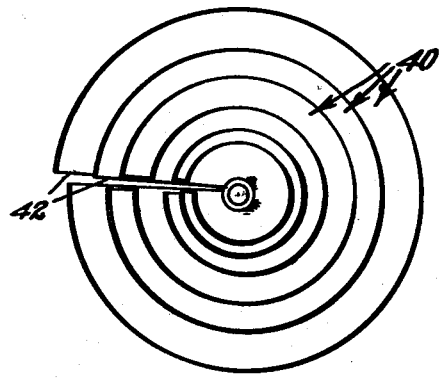
Figure 5 is a bottom plan view of the auger portion shown in Figure 4.

The container 10 is adapted to be received about an auger 20 in use, the latter being shown in Figure 4.

The auger 20 is provided with a central shaft 22 which latter is secured by means of a suitable coupling 25 to the driving shaft 24 of a mixer 26. The mixer 26 is provided with a motor 28, a frame 30 and a stand or platform 32.

The auger 20 is provided with a plurality of convolutions 40. The convolutions 40 are separate, as shown in Figure 4, for providing cutting edges 42 which are adapted to cleave the frozen confection to facilitate stirring thereof. If desired, the edges 42 may be sharpened.

Figure 6:
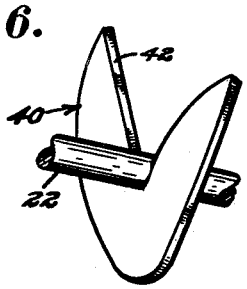
Figure 6 is a perspective view of one of the convolutions of the auger, shown as secured to a portion of the auger-shaft.
Figure 7:
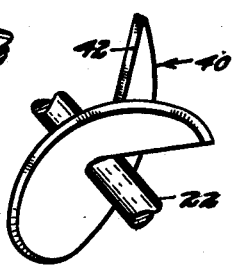
Figure 7 is another perspective view of the convolution shown in Figure 6.
Figure 8:
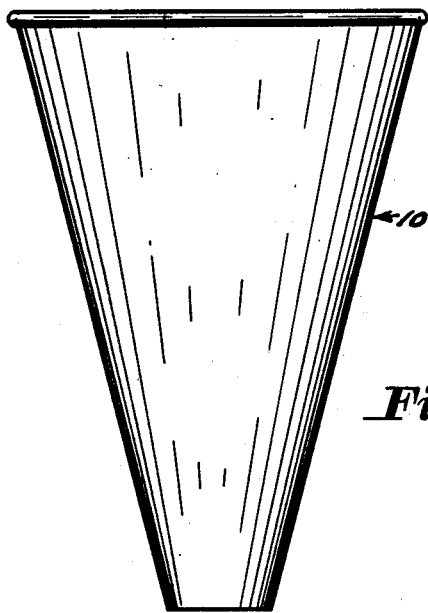
Figure 8 is a side elevation of the preferred form of container.
Figure 9:
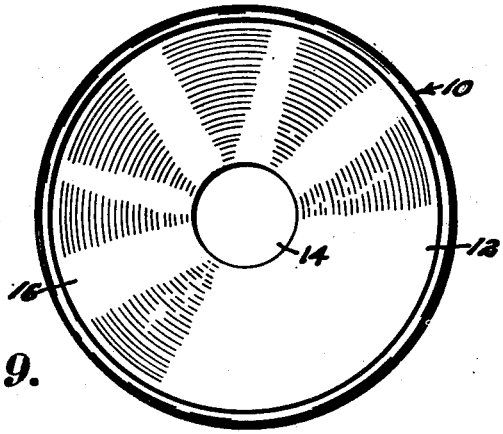
Figure 9 is a top plan view of the container of Figure 8.

The convolutions 40 may be cut from a flat piece of sheet metal and then sliced radially thereof and bent apart after being sliced for attaining the shape shown in Figures 4, 6 and 7. Such shapes are substantially the equivalent of convolutions of a spiral auger. The convolutions 40 may be welded or otherwise similarly secured to the shaft 22.

The convolutions 40 are preferably disposed on the shaft 22 so that parts of each convolution overlap parts of the adjacent convolutions, this construction not being shown in Figure 4. This is for the purpose of insuring a complete cleaning of the container 10 automatically and following stirring.

The shape of the outer edges of the convolutions 40 should be such as to permit the edges to simultaneously engage the interior wall of the container 10 at times when the container 10 is completely pushed up onto the auger.

It will be seen that the lowermost convolutions are of lesser size than upper convolutions so that they will be shaped complementally to the container.

In lieu of the separated convolutions shown in Figure 4, an auger having continuous convolutions may also be employed with very similar results and such is also contemplated in this invention.

In operation, a mass of frozen confection of frusto-conical shape is delivered to the dealer from a creamery or factory. The operator then places the frozen confection in the container 10 and pushes the container 10 upwardly onto the lowermost of the convolutions 40 with his hand 70.

The lowermost convolutions stir the frozen confection as the latter is being pushed upon the auger for changing the confection to a more viscous state gradually permitting the more easy reception of the auger into the confection.

It will be found that stirring is substantially complete before the uppermost convolutions enter the confection. A primary purpose of the uppermost convolutions is to cover the container to prevent splashing.

Figure 3:
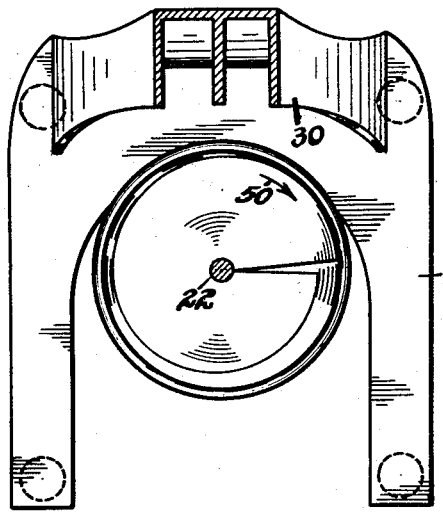
Figure 3 is a view in section taken along the line 3—3 of Figure 1.

As the confection is stirred, it is forced downwardly by the auger which latter rotates in the direction of the arrow 50 in Figure 3. The confection is thus forced outwardly of the hole 13 at the bottom of the container 10 into the glass 60, shown in dotted lines in Figure 1, which latter is placed beneath the container 10 preparatory to stirring.

This invention has provided a frozen confection mixer which is adapted to more quickly deliver frozen confections in more uniform and optimum states of mixing, viscosity, and palatability.

From the foregoing description, it is thought to be obvious that a mixing device constructed in accordance with my invention is particularly adapted for use by reason of the convenience and facility with which is may be assembled and operated, and it will also be obvious that my invention is susceptible of some change and modification without departing from the principles and spirit thereof, and for this reason, I do not wish to be understood as limiting myself to the precise arrangement and formation of the several parts herein shown in carrying out my invention in practice, except as claimed.

Subject matter disclosed but not claimed in this application is covered by my co-pending application, Serial No. 168,974, filed June 19, 1950.

I claim:

1. A mixing device comprising in combination, a container, said container having open ends and having a frusto-conically shaped hollow interior in communication with said end openings; and an auger complementally shaped with respect to said interior, the axial spacing of the successive convolutions of the auger diminishing as the size of the convolutions diminish whereby the convolutions at the small end of the auger are closer together than those at the large end, said container being relatively positionable into and out of operative relation with the auger, and means for rotating the auger when the container is positioned in operative relation with the auger.

2. A mixing device comprising in combination, a container, said container having an open top and an open bottom, said top opening being of larger size than said bottom opening, said container having an inclined side wall tapering, from a wider normally upper end adjacent said upper opening to a narrower normally lower end adjacent said smaller opening; and an auger, each convolution of said auger except the end convolutions being spaced farther from the convolution above than it is from the convolution below, said container being relatively positionable into and out of operative relation with the auger, and means for rotating the auger when the container is positioned in operative relation with the auger.

3. A mixing device comprising in combination, a container, said container having an open top and an open bottom, said top opening being of larger size than said bottom opening, said container having a hollow interior in communication with said end openings, and oppositely disposed portions of the interior wall of said container being inclinedly disposed toward each other as said smaller opening is approached and along at least a portion of said wall between said openings; an auger, said auger having a vertical stem of uniform cross section, and each convolution on the stem except the end convolutions being spaced farther from the convolution above than it is from the convolution below, said container being relatively positionable into and out of operative relation with the auger, and means for rotating the auger when the container is positioned in operative relation with the auger.

4. A device for converting a solid pre-frozen comestible to semi-solid condition comprising in combination, a vertically moving container for receiving the solid comestible, said container having an open top and an open bottom, said top opening being of larger size than said bottom opening, said container having a hollow interior in communication with said end openings, and oppositely disposed portions of the interior wall of said container being inclinedly disposed toward each other as said smaller opening is approached and along at least a portion of the wall of said interior between said openings; and an auger adapted to be positioned in and out of said container responsive to a vertical movement of the latter, the convolutions of said auger each being of a size and contour complemental to the shape of the interior wall of said container so that said convolutions are adapted to be simultaneously disposed closely spaced apart from the interior wall of said container at desired times, and the axial spacing of the successive convolutions of the auger diminishing as the size of said convolutions diminish whereby the convolutions at the small end of the auger are closer together than those at the large end, and means for rotating the auger when positioned in the container.

5. Apparatus for converting a solid, pre-frozen comestible to semi-solid condition, comprising in combination, a container to receive the solid comestible, said container having an open top and an open bottom, said top opening being of larger size than said bottom opening, said container having a hollow interior in communication with said end openings, and oppositely disposed portions of the interior wall of said container being inclinedly disposed toward each other as said smaller opening is approached and along at least a portion of the wall of said interior between said openings; and an auger, each convolution extending once around the axis of said auger and being imperforate, the successive convolutions of said auger being circumferentially spaced apart from one another for providing cutting edges, and adjacent vertically spaced convolutions forming with the wall of said container an enclosed spiral passageway extending once around the axis of the auger, said container being relatively positionable into and out of operative relation with the auger, and means for rotating the auger when the container is positioned in operative relation with the auger.

6. As a new article of manufacture, an auger having a shaft of uniform transverse cross section, a plurality of convolutions axially secured to said shaft, each said convolution being succesively larger in diameter than a next adjacent convolution, whereby the auger is of frusto-conical contour in side elevation.

7. An article of manufacture as described in claim 6 in which the convolutions thereof are separated with respect to each other.

8. An article of manufacture comprising an auger having a shaft of uniform transverse cross section, a plurality of convolutions axially secured to said shaft, each said convolution being successively larger in diameter than the next adjacent convolution, whereby the auger is of frusto-conical contour in side elevation, the axial spacing of the successive convolutions diminishing as the size of the convolutions diminish whereby the convolutions at the small end of the auger are closer together than those at the large end.

9. An article of manufacture comprising an auger having a shaft of uniform transverse cross section, a plurality of convolutions axially secured to said shaft, each said convolution being successively larger in diameter than the next adjacent convolution, whereby the auger is of frusto-conical contour in side elevation, the successive convolutions of the auger being separated from one another by slots extending from the margin of the auger inwardly toward the shaft, said convolutions otherwise being imperforate.

10. An article of manufacture comprising an auger having a shaft of uniform transverse cross section, a plurality of convolutions axially secured to said shaft, each said convolution being successively larger in diameter than the next adjacent convolution, whereby the auger is of frusto-conical contour in side elevation, the successive convolutions of the auger being separated from one another by slots extending from the margin of the auger inwardly toward the shaft, said convolutions otherwise being imperforate, the edges of the convolutions on either side of each slot being canted in opposite axial directions.

11. Apparatus for converting a solid, pre-frozen comestible to semi-solid condition, comprising an open top hopper for receiving the solid comestible, said hopper having downwardly converging side walls communicating with a restricted opening in the bottom of the hopper, a tapered auger normally outside of said hopper but adapted to be introduced into the open upper end of the hopper after the solid comestible has been placed therein, the axial spacing of the successive convolutions of the auger diminishing as the size of the convolutions diminish whereby the convolutions at the small end of the auger are closer together than those at the large end, and means for rotating said auger about a vertical axis to mince the comestible and extrude it through said vertical opening.

12. In apparatus for plasticizing and mixing a pre-frozen comestible, a hopper for receiving the comestible to be treated, said hopper comprising an upright open ended circular tube tapering from its upper end to its lower end, a rotatable auger relatively positionable in and out of the tube, means for rotating the auger when in the tube, said auger when rotating in the tube being adapted to advance the comestible downwardly through the tube, said auger when in the tube having its entire margin in substantial engagement with the interior of the tube whereby it forms with the tube a spiral passageway for the comestible extending around the axis of the auger, said passageway diminishing in cross sectional area in the direction of movement of the comestible along the passageway, whereby the comestible is subjected to increasing pressure as it advances, and said hopper being movable downwardly relatively to said auger thereby to withdraw from the auger and thus facilitate subsequent charging of the hopper with the pre-frozen comestible.

13. A device as in claim 2 wherein said container is adapted to be moved away from said auger, thereby to facilitate subsequent charging of the container with the material to be mixed.

14. A device as in claim 5 wherein said container is adapted to be moved vertically away from said auger, thereby to facilitate subsequent charging of the container with said solid comestible.

15. Apparatus as in claim 11 wherein said auger comprises a broken flight auger.

16. Apparatus as in claim 12 wherein said auger comprises a broken flight auger, each flight extending substantially one full turn around the axis of the auger.

17. In apparatus for converting a solid, pre-frozen comestible to semi-solid condition, a hopper for receiving the solid comestible, said hopper comprising an upright, open ended circular tube tapering from its upper end to its lower end, an auger relatively positionable in and out of the tube, said auger comprising a vertical stem with a series of spiral flights thereon each extending once around the stem, each flight being imperforate and bridging the annular space between the stem and the interior wall of the tube whereby adjacent flights form, with the tube, a spiral passageway for the comestible extending once around the stem, the leading edge of each flight after the first confronting and subdividing the discharge end of one of said passageways, means for rotating the auger to advance the comestible downwardly in said tube, said hopper being movable downwardly relative to said auger thereby to withdraw the auger from the hopper and thus facilitate subsequent charging of the hopper with said solid comestible.

18. Apparatus for converting a solid, pre-frozen comestible to semi-solid condition, comprising a hopper member for receiving the solid comestible, said hopper member having an open top and an open bottom, the top opening being larger than the bottom opening, said hopper member having a circular side wall tapering from said larger top opening to said smaller bottom opening, a complementally tapered auger member adapted to be removably received in said hopper member in operative relation therewith and with substantially its entire margin engaging the interior of the hopper member, means for turning the auger member about a vertical axis in a direction to advance the comestible in the hopper member downwardly toward said bottom opening, the axial spacing of the successive convolutions of the auger diminishing as the size of the convolutions diminish whereby the convolutions at the small end of the auger member are closer together than those at the large end, and one of said members being movable vertically away from the other member to withdraw said auger member from the hopper member through said larger top opening thereby to facilitate subsequent charging of the hopper member with the solid comestible.

19. Apparatus for converting a solid, pre-frozen comestible to semi-solid condition, comprising a hopper member for receiving the solid comestible, said hopper member having an open top and an open bottom, the top opening being larger than the bottom opening, said hopper member having a circular side wall tapering from said larger top opening to said smaller bottom opening, a complementally tapered auger member adapted to be removably received in the hopper member in operative relation therewith and with substantially its entire margin engaging the interior of the hopper member, means for turning said auger member about a vertical axis in a direction to advance the comestible in said hopper member downwardly toward said bottom opening, each convolution of said auger member extending once around the axis of the auger member and being imperforate, the successive convolutions of the auger member being circumferentially spaced apart to provide cutting edges and the adjacent vertically spaced convolutions forming with the wall of the container an enclosed spiral passageway extending once around the axis of the auger member, and one of said members being movable vertically away from the other member to withdraw said auger member from the hopper member through said larger top opening thereby to facilitate subsequent charging of said hopper member with the solid comestible.

CLAUDE REED.

REFERENCES CITED

The following references are of record in the file of this patent:

UNITED STATES PATENTS

| Number | Name | Date |
| --- | --- | --- |
| 667,250 | Porter | Feb. 5, 1901 |
| 1,458,492 | Mathews et al. | June 12, 1923 |
| 1,600,948 | Poore | Sept. 21, 1926 |
| 2,088,336 | Neitzke | June 27, 1937 |
| 2,191,344 | Erickson | Feb. 20, 1940 |
| 2,402,931 | Thomas | June 25, 1946 |
| 2,415,585 | Genova | Feb. 11, 1947 |